United States Patent [19]

Eggleston

[11] 3,941,406

[45] Mar. 2, 1976

[54] BICYCLE CARRYING RACK

[76] Inventor: David M. Eggleston, 5732 Mary Lane Drive, San Diego, Calif. 92115

[22] Filed: Dec. 9, 1974

[21] Appl. No.: 531,039

[52] U.S. Cl. .................. 280/400; 211/5; 211/8; 211/17; 296/1 A
[51] Int. Cl.² .......................................... B60P 3/06
[58] Field of Search ............ 280/400, 402; 296/1 A; 224/42.03 B; 211/17–22, 5, 8; 105/367

[56] References Cited
UNITED STATES PATENTS

| | | | |
|---|---|---|---|
| 603,777 | 5/1898 | Skrine | 105/367 |
| 3,734,558 | 5/1973 | Stead | 296/1 AX |
| 3,753,579 | 8/1973 | Kurilich | 280/400 |
| 3,865,244 | 2/1975 | Galen | 211/5 |

FOREIGN PATENTS OR APPLICATIONS

| | | | |
|---|---|---|---|
| 7,451 | 1898 | United Kingdom | 211/17 |
| 1,097,303 | 12/1957 | Germany | 211/17 |

*Primary Examiner*—Robert R. Song
*Assistant Examiner*—John A. Pekar
*Attorney, Agent, or Firm*—Ralph S. Branscomb

[57] ABSTRACT

A multiple bicycle carrying rack comprising a bed or base member having raised grooved tracks of alternately staggered heights onto which bicycles are rolled and handle-bargripping clamps which are lowered from an overlying support to forceably engage the handlebars and thereby restrain the movement of the bicycles in any direction. The clamps are staggered longitudinally of the rails, which in conjunction with the vertically staggered wheel grooves permits very close lateral spacing of the bicycles, an important feature inasmuch as the rack will be made into, or transported on, a trailer. Double locking of the bicycles is accomplished by locks for the handlebar clamps and cables passing from the base member through the bicycle frames to the clamp locks.

8 Claims, 5 Drawing Figures

BICYCLE CARRYING RACK

BACKGROUND OF THE INVENTION

The invention is a multiple bicycle carrying rack intended to meet the needs of cyclists who commute long distances or must pass through dangerous or prohibited traffic areas such as freeways to reach a destination wherein bicycle use is practical or permitted. The rack is preferably provided with wheels and towed behind a mass transit bus or the like for commuter use but could also be used to serve the needs of bicycle touring groups, which have become increasingly popular in the last few years. These groups often travel ensemble to a scenic area by motor transportation and conduct the bicycle tour in that area, or bicycle one way only to or from home, so that a means of transporting the bicycles is needed.

For bicyclists traveling by bus, there is no rack available that will carry the large number of bicycles needed and hold them securely and safely throughout the jostling and jarring that they often encounter on the roads over which they must be transported to reach the distination.

SUMMARY OF THE INVENTION

The present invention meets the above detailed need and provides an extremely rugged bicycle rack capable of carrying a large number of bicycles very securely and successfully preventing the occurence of any chafing or other damage to the bicycles in transit, and at the same time permitting immediate access to any one, or any number, of the bicycles in the rack without the necessity of first removing other bicycles, and providing for the quick loading and unloading of the bicycles.

The unit may be provided with wheels and serve as a trailer, or left without wheels and carried in an existing trailer. A bed or base member has a plurality of parallel raised rails thereon and each rail defines a trough or groove in its upper side to seat the wheels of a bicycle. A long crossbar is supported on the base above the height of the bicycles and clamps are mounted in staggered fashion on the bar above the troughs. The clamps can be individually lowered over the handlebars and a means of forcing the clamps firmly against the handlebars and locking them in this position is provided, the embodiment illustrated employing modified jacks for this purpose. The jacks may be locked with a padlock, and further security against theft is provided by cables installed adjacent each bicycle station which can be passed through the bicycle frames and coupled to the padlock.

DETAILED DESCRIPTION OF THE PREFERRED EMBODIMENT

Figure 1:
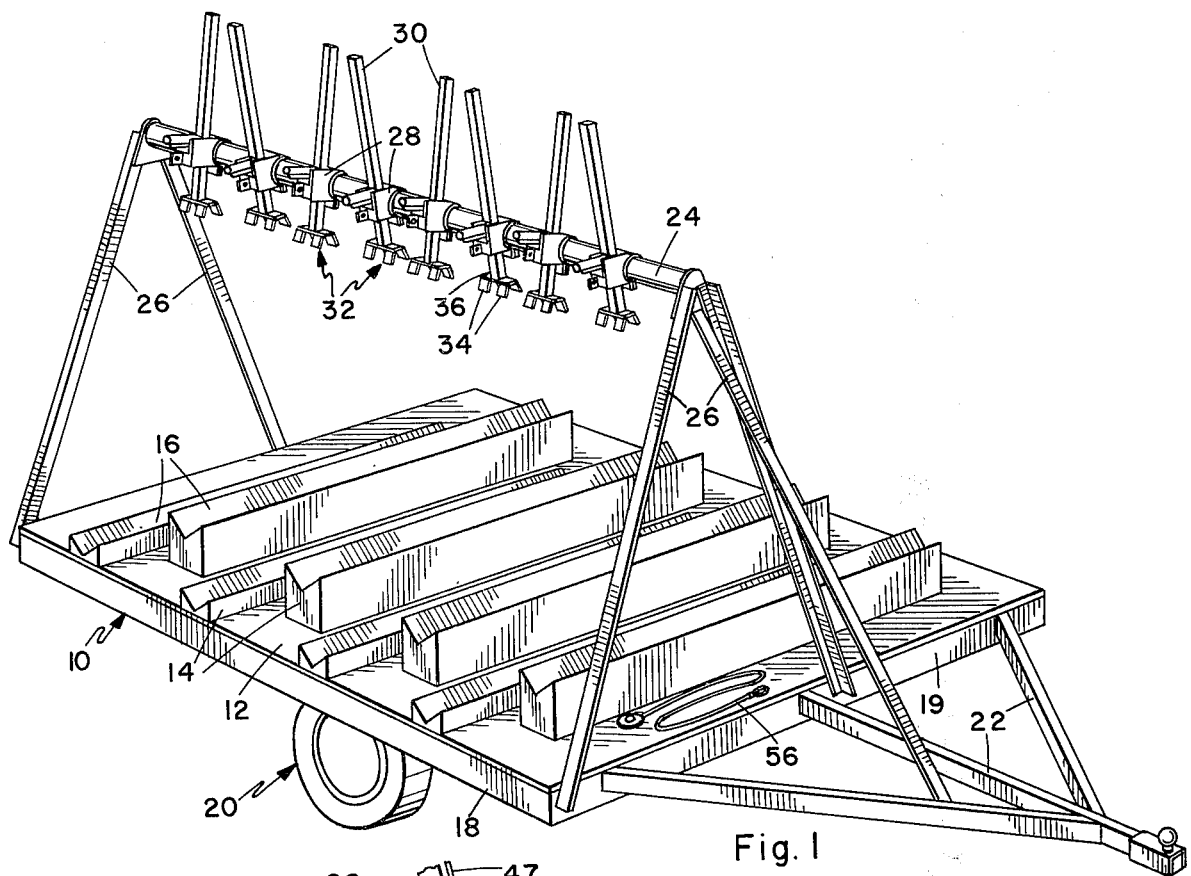
FIG. 1 is a perspective view of the complete rack assembly as used as a trailer.

The rack comprises a base member 10 which includes a planar panel 12 composed of plywood or other suitably rigid material, and a series of parallel rails or beams 14 each of which defines a trough 16. The panel 12 may be supported by any suitable frame structure such as the rim 18 and whatever underlying crossbeams 19 are needed. The base member may be used in an existing flat bed trailer, or by the simple addition of wheel structure 20 and hitch structure 22, the unit may itself be made into a trailer.

A support means is established above the level of the bicycles by a cross bar 24 supported on braces 26, the braces being welded to the cross bar at the top and the rim 18 and to the hitch structure 22 at the bottoms. Spaced along the crossbar are jacks 28 which are rigidly mounted thereto, and the jack shafts 30 serve as shafts for clamp elements 32, the latter each comprising two spaced downwardly open V-brackets 34 connected to the respective shaft by a spanner bar 36.

Figure 5:
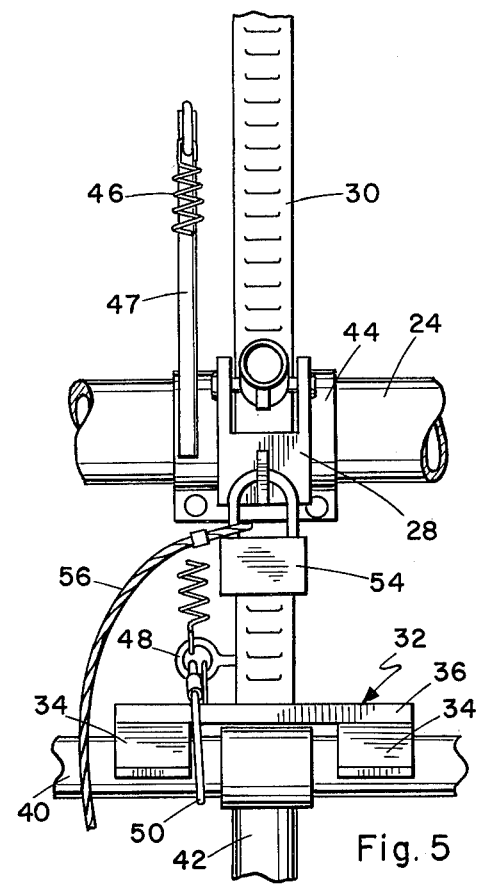
FIG. 5 is a side elevation showing the details of a jack clamp assembly.
Figure 3:
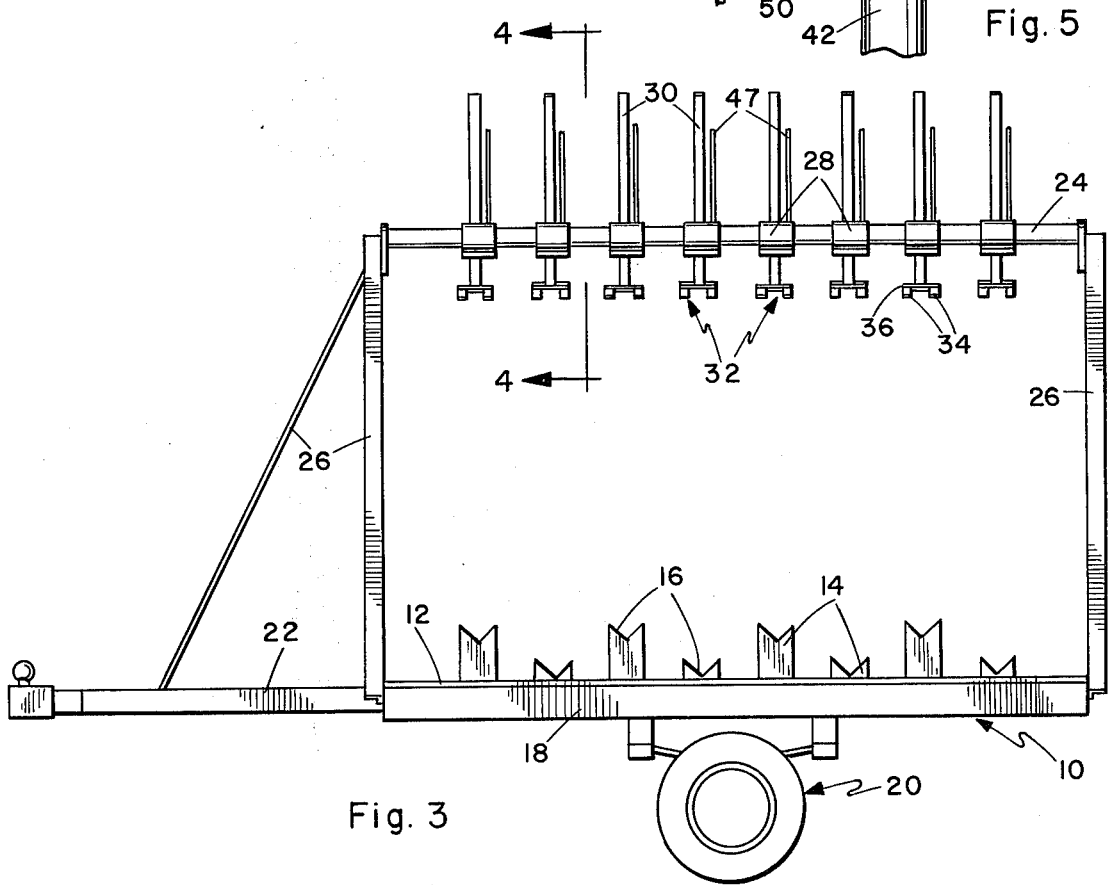
FIG. 3 is a side elevation of the complete rack as used as a trailer.

After the bicycles 38 to be transported are rolled into the troughs, the respective clamps 32 are forced down by the jacks, which are of course operating upside down from their normal mode, so that the V-brackets 34 of each clamp each engage an inner portion of each of the handlebars 40 such that the clamp straddles the central steering column 42 as best shown in FIG. 5. Although jacks have a built-in catch means to retain the clamps in the handlebar-engaging position, if equivalent structure is used in place of the jacks, catch means must be incorporated. The clamps should of course be padded or coated with a resilient material to prevent marring the bicycles, and discretion must be used when operating the jacks to avoid crushing the bicycles.

Figure 2:
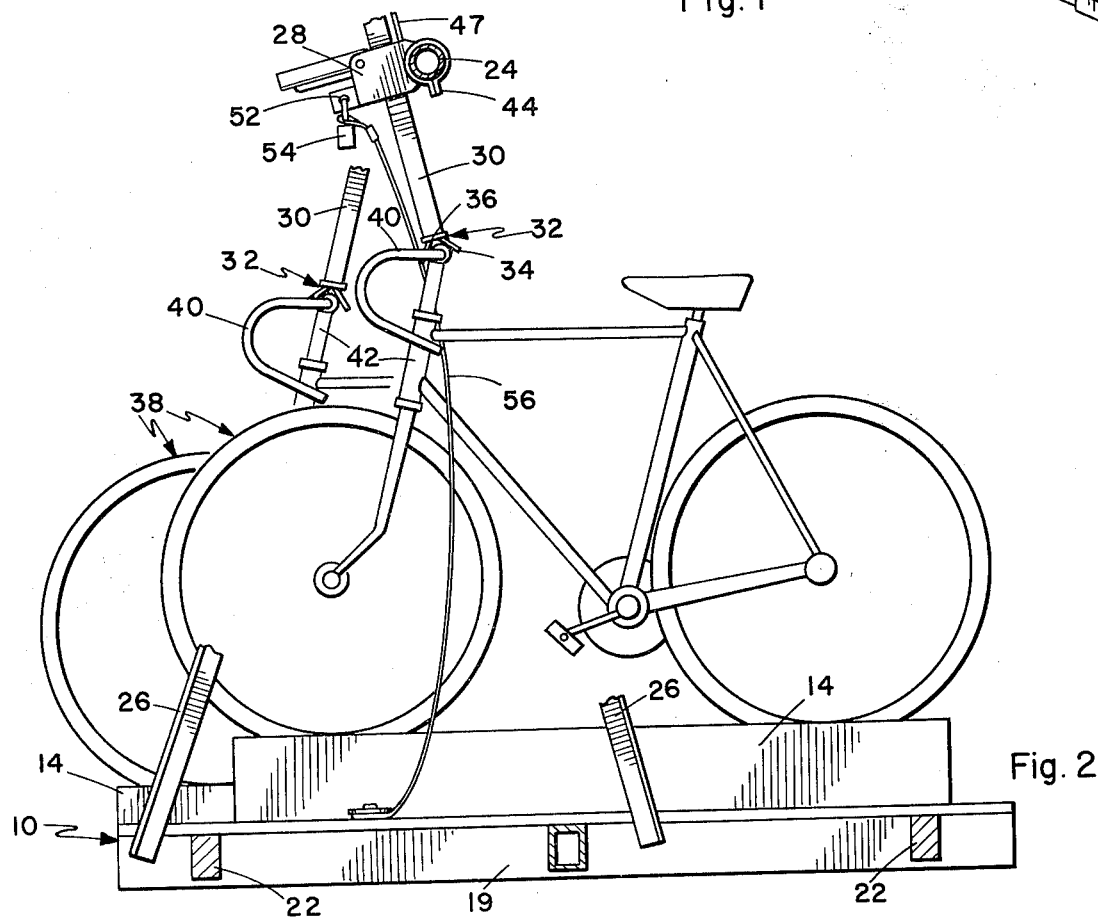
FIG. 2 is a front elevation view of the rack with portions cutaway and showing the position of two representative bicycles carried in the rack.

The jacks are oriented on the crossbar 24 so that the shafts 30 project at alternately staggered angles, which in conjunction with the staggered levels of the troughs 16 permit the bicycles to be carried with reduced lateral separation without the handlebars of adjacent bicycles interfering, as shown best in FIG. 2. The depending shafts 30 should be at an angle such that the projections thereof fall between the points of contact of the two wheels with the trough so that the force produced by each jack does not have an unstabilizing component.

Figure 4:
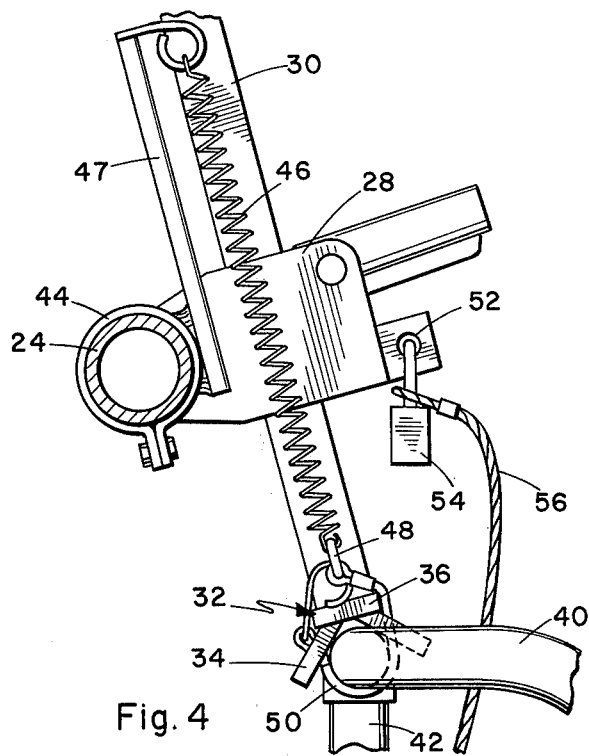
FIG. 4 is a section view taken along lines 4—4 of FIG. 3.

The jack structure is detailed in FIGS. 4 and 5. Each jack mechanism is attached to the crossbar 24 by any suitably durable means such as by a clamp 44 to which the jack has been welded, and it is preferred that a spring 46 be tensioned between the jack and jack shaft or clamp to return the shaft to its raised position when the catch is released, and since the latter structure will be fairly heavy. The upper end of the spring is preferably attached to any upwardly extending rod 47 so that more uniform spring tension will be effected at different shaft positions. An eyelet 48 which serves as the attachment point of the spring to the shaft is also used to connect a safety strap 50 which encircles the handlebars to reduce the chances of an accident should one of the jacks be improperly secured.

A portion of each jack mechanism is provided with an aperture 52 which is integrated with the working mechanism such that a padlock 54 engaged in the aperture will prevent operation of the jack. And for added protection against theft a strong cable 56 is anchored to the base member 10 near each bicycle station and can be threaded through the bicycle frame and secured by the padlock as shown best in FIG. 2.

The operation of the rack should be clear from the above description. One or more bicycles are rolled into the troughs 16, the clamps 32 jacked down over the handlebars, and the locking means actuated, no more than 10 seconds being required to load a bicycle onto or off of the rack. Loading and unloading can be accomplished from the handlebar side of the rack, which may be stationed curbside for safety, and any individual bicycle can be loaded or unloaded without distrubing adjacent bicycles. Any type of bicycle can be transported in the unit, including those with "butterfly" or high rise handlebars, and ladies' bicycles.

It is noted that the jack mechanism may be replaced with other structure which accomplish the same general purpose, and the seat or other structural member of the bicycle rather than the handlebars could conceivably be clamped, although it is doubtful that such an arrangement would effect the stability, durability, safety, versatility, and ease of operation of the illustrated embodiment.

I claim:

1. A rack for carrying at least one bicycle or the like comprising:
   a. a base member defining a plurality of upwardly open elongated parallel troughs each dimensioned to seat the wheels of a bicycle placed in longitudinal alignment therein, and said troughs being vertically staggered to prevent interference of the handlebars of adjacent bicycles carried in said rack;
   b. a plurality of clamp elements and means mounting same to said base member in spaced relation above said trough;
   c. each of said clamp elements being staggered relative to adjacent clamp elements and capable of securely and releasibly engaging a structural member of a bicycle resting in a respective one of said troughs.

2. Structure according to claim 1 wherein each of said clamp elements includes two spaced generally downwardly open generally V-shaped brackets mounted on a jack shank and dimensioned to engage the portions of the handlebars of a bicycle adjacent the central steering column thereof, and said mounting means includes a plurality of jacks, each of which engages a respective one of said shanks, whereby said brackets can be forcibly lowered against the handlebars of a plurality of bicycles.

3. Structure according to claim 2 and including spring means biasing said clamp elements upwardly into said jacks.

4. Structure according to claim 2 wherein said jacks have structural means permitting the immobilization thereof by a padlock, and including cables mounted at one end to said base member, each having an eyelet in the other end, and of lengths sufficient to pass through a bicycle frame and reach said structural means to permit engagement of said eyelets by padlocks secured therein, whereby bicycles carried in the rack can each be doubly locked by a single padlock.

5. Structure according to claim 1 wherein said troughs are alternately vertically staggered.

6. Structure according to claim 1 wherein said clamping elements are staggered longitudinally with respect to said parallel troughs to prevent interference with handlebars of adjacent bicycles carried in said rack.

7. Structure according to claim 1 wherein said support means includes an elongated bar braced above and parallel to said base member and extending perpendicularly to said troughs near one end thereof and said clamp elements are mounted on said bar and depend therefrom and are lowerable to engage bicycle handlebars.

8. Structure according to claim 1 wherein said base member is provided with wheels whereby the entire rack can be towed as a trailer.

* * * * *